United States Patent
Islam et al.

(10) Patent No.: US 8,725,144 B2
(45) Date of Patent: *May 13, 2014

(54) APPARATUS AND METHOD FOR PERFORMING NETWORK SCANNING USING BLACK-LIST NETWORK INFORMATION

(75) Inventors: M. Khaledul Islam, Ottawa (CA); Asif Hossain, Kanata (CA)

(73) Assignee: BlackBerry Limited, Waterloo, Ontario (CA)

( * ) Notice: Subject to any disclaimer, the term of this patent is extended or adjusted under 35 U.S.C. 154(b) by 25 days.

This patent is subject to a terminal disclaimer.

(21) Appl. No.: 13/330,071

(22) Filed: Dec. 19, 2011

(65) Prior Publication Data
US 2012/0088503 A1    Apr. 12, 2012

Related U.S. Application Data

(63) Continuation of application No. 12/175,596, filed on Jul. 18, 2008, now Pat. No. 8,107,955.

(51) Int. Cl.
*H04W 4/00*    (2009.01)
(52) U.S. Cl.
USPC ........................ 455/434; 455/435.2; 455/440
(58) Field of Classification Search
USPC .................... 455/434, 435.2, 432.1
See application file for complete search history.

(56) References Cited

U.S. PATENT DOCUMENTS

| | | |
|---|---|---|
| 5,163,161 A | 11/1992 | Bowles et al. |
| 5,551,071 A | 8/1996 | Nakano et al. |
| 5,754,956 A | 5/1998 | Abreu et al. |
| 5,822,686 A | 10/1998 | Lundberg et al. |
| 5,937,351 A | 8/1999 | Seekins et al. |
| 6,148,203 A | 11/2000 | Renko et al. |
| 6,226,527 B1 | 5/2001 | Dalsgaard et al. |
| 6,765,891 B2 | 7/2004 | Laitinen et al. |
| 6,778,827 B1 | 8/2004 | Anderson et al. |
| 6,810,251 B2 | 10/2004 | Hassan et al. |
| 6,889,049 B2 | 5/2005 | Khawand |
| 7,299,042 B2 | 11/2007 | Moore et al. |
| 8,023,896 B2 | 9/2011 | Hildebrand et al. |
| 2001/0005359 A1 | 6/2001 | Bergqvist |

(Continued)

FOREIGN PATENT DOCUMENTS

| | | |
|---|---|---|
| CN | 1989713 A | 6/2007 |
| EP | 1739990 | 1/2007 |

(Continued)

OTHER PUBLICATIONS

Notice of Allowance dated Apr. 6, 2012 from related U.S. Appl. No. 12/356,710.

(Continued)

*Primary Examiner* — George Eng
*Assistant Examiner* — Jing Gao (57) ABSTRACT

An apparatus and method is provided for making use of black-list network information to make scanning more efficient in multi-mode mobile devices. When performing a scan for a network, if a network that is blacklisted is found, scanning is discontinued for any network that has the same radio access technology as the network that was found. Thus, excessive scanning that can be costly for the mobile device in terms of battery life and responsiveness to provide service, is avoided.

21 Claims, 8 Drawing Sheets

(56) References Cited

U.S. PATENT DOCUMENTS

| | | |
|---|---|---|
| 2002/0105927 A1 | 8/2002 | Holma et al. |
| 2004/0082328 A1 | 4/2004 | Japenga et al. |
| 2004/0125783 A1 | 7/2004 | Hsueh et al. |
| 2004/0157608 A1 | 8/2004 | Kurose et al. |
| 2004/0248572 A1 | 12/2004 | Ormson |
| 2005/0202828 A1 | 9/2005 | Pecen et al. |
| 2005/0266845 A1 | 12/2005 | Aerrabotu et al. |
| 2005/0282544 A1 | 12/2005 | Oommen et al. |
| 2006/0009216 A1 | 1/2006 | Welnick et al. |
| 2006/0084443 A1 | 4/2006 | Yeo et al. |
| 2006/0154699 A1 | 7/2006 | Ko et al. |
| 2007/0004408 A1* | 1/2007 | Buckley et al. ............ 455/435.2 |
| 2007/0207815 A1* | 9/2007 | Alfano et al. .............. 455/456.1 |
| 2007/0230420 A1 | 10/2007 | Bumiller et al. |
| 2008/0014957 A1 | 1/2008 | Ore |
| 2008/0153486 A1* | 6/2008 | Ramkull et al. ............. 455/434 |
| 2008/0176564 A1 | 7/2008 | Eerolainen |
| 2009/0047958 A1 | 2/2009 | Rimhagen et al. |
| 2010/0222055 A1 | 9/2010 | Cho et al. |

FOREIGN PATENT DOCUMENTS

| | | |
|---|---|---|
| EP | 1744573 | 1/2007 |
| EP | 1788832 | 5/2007 |
| EP | 1830596 | 9/2007 |
| EP | 1858278 | 11/2007 |
| EP | 1921882 | 5/2008 |
| EP | 1921885 | 5/2008 |
| WO | 9219982 | 11/1992 |
| WO | 0016581 | 3/2000 |
| WO | 0133481 | 5/2001 |
| WO | 0162034 | 8/2001 |
| WO | 0176274 | 10/2001 |
| WO | 0221875 | 3/2002 |
| WO | 2004010719 | 1/2004 |
| WO | 2005011134 | 2/2005 |
| WO | 2005120123 | 12/2005 |
| WO | 2006014092 | 2/2006 |
| WO | 2007076232 | 7/2007 |
| WO | 2008154218 | 12/2008 |

OTHER PUBLICATIONS

Office Action dated Mar. 22, 2012 from related U.S. Appl. No. 12/362,616.

3GPP; "3rd Generation Partnership Project; Technical Specification Group GSM/EDGE Radio Access Network; Radio subsystem link control (Release 8)"; GSM Global System for Mobile Communications; 3GPP TS 45.008 V8.0.0 (Aug. 2008); total pp. 126.

3GPP; "3rd Generation Partnership Project; Technical Specification Group Radio Access Network; Requirements for support of radio resource management (FDD) (Release 5)"; 3GPP TS 25.133 V518.0 (Sep. 2007); Total pp. 82.

3GPP; "3rd Generation Partnership Project; Technical Specification Group GSM/EDGE Radio Access Network; Mobile radio interface layer 3 specification; Radio Resource Control (RRC) protocol (Release 5)"; GSM Global System for Mobile Communications; 3GPP TS 44.018 V5.22.0 (May 2006); Total pp. 320.

European Search Report, European Patent Application No. EP08160765, Jan. 5, 2009, total pp. 2.

Examination Report dated Jun. 8, 2010 from related European Patent Application No. 09151727.6.

Ericsson, "On Inter-RAT Cell Reselection Principles", http://www.3gpp.org/ftp/tsg_ran/WG2_RL2/TSGR2_57/Documents/, retrieved on Apr. 23, 2008.

European Search Report, European Patent Application No. 09151050.3, dated Jun. 29, 2009.

European Search Report, European Patent Application No. 09151727.6, Jul. 23, 2009.

Office Action dated Jul. 29, 2011 from related U.S. Appl. No. 12/356,710.

Office Action dated Jul. 22, 2011 from related U.S. Appl. No. 12/362,616.

Office Action dated Feb. 15, 2013 from related U.S. Appl. No. 13/542,180.

English-language translation of an Office Action dated Jul. 4, 2012 from corresponding Chinese Patent Application No. 201010135567.1.

* cited by examiner

| Selection Control Code (SCC) 402 | Selection Criterion 404 |
|---|---|
| 0000 | Always Forbidden |
| 0001 | Always Forbidden unless only network available |
| 0010 | Always Forbidden for automatic network selection only |
| 0011 | Always Forbidden for manual network selection only |
| 0100 | Forbidden for automatic selection unless only network available |
| 0101 | Forbidden for manual selection unless only network available |
| ... | ... |
| 0110-1111 | Reserved for future extensions |

| Network Identifier | Selection Control Code (SCC) | Application of SCC |
|---|---|---|
| MCC2.MANC1 | 0000 | In region identified with MCC2, MANC1 is always forbidden for all core networks |
| MCC2.MANC2 | 0000 | In region identified with MCC2, MANC2 is always forbidden for all access networks (RATs) |
| MCC2.MANC2 | 0011 | In region identified with MCC3, MANC1.MCNC2 cannot be selected for manual network selection |
| ... | ... | ... |

APPARATUS AND METHOD FOR PERFORMING NETWORK SCANNING USING BLACK-LIST NETWORK INFORMATION

RELATED APPLICATION

This application is a continuation of previously filed U.S. application Ser. No. 12/175,596 filed Jul. 18, 2008, the entire disclosure of which is incorporated by reference.

FIELD OF THE DISCLOSURE

This disclosure relates to wireless communication, and more particularly to scanning for networks using a multi-mode mobile device.

BACKGROUND

It is becoming common place to implement mobile devices with multiple modes to enhance roaming capabilities. Each mode employs a different radio access technology (RAT) which is associated with a Radio Access Network (RAN) and a core network. Examples of modes that may be implemented in a multi-mode device include cdma2000 (commonly referred to as CDMA 1x and 1xEV-DO), GSM/GPRS/EDGE, and UMTS/HSPA. In addition, a multimode device may support other air interfaces such as IEEE 802.11a/b/g/n, 802.12.16/16e and similar standards.

The cdma2000 air-interface currently uses the 850 MHz band (also known as cellular band or band class 0) and the 1900 MHz band (also known as the PCS band or band class 1) in North America. The GSM/GPRS/EDGE air interface typically uses the 900 MHz band (also known as E-GSM band) and the 1800 MHz band (also known as DCS band) in Europe, 900 MHz band in Asia and Africa, and uses the 850 MHz band and the 1900 MHz band in North America and the Caribbean. UMTS/HSPA currently uses the 2100 MHz band (also known as IMT-2000 band) in Europe and Asia, and uses the 850 MHz band and the 1900 MHz band in North America. In addition, the 900 MHz band is currently open for UMTS/HSPA use in several countries and the 1800 MHz band will be open for UMTS/HSPA use in near future.

Each of the frequency bands has an associated uplink band and downlink band. Each uplink band and each downlink band is typically divided up into 5 MHz blocks. In addition, each uplink block is paired with a downlink block. Typically the regulatory board in a given country assigns one or multiple blocks of a frequency band to a network operator or carrier. An assigned frequency block within a frequency band is used by an assigned carrier using a particular radio access technology. Some frequency bands can be used by multiple radio access technologies. For example, 850 MHz and 1900 MHz bands are used by network operators who have deployed cdma2000, GSM/GPRS/EDGE, and UMTS/HSPA in these bands. In this case, each radio access technology uses non-overlapping frequency blocks within the same band with an appropriate guard band in-between. Similarly, 900 MHz and 1800 MHz bands, which are currently used by GSM/GPRS/EDGE, may also be available for UMTS/HSPA radio access technologies in the future based on recommendation of regulatory boards. A network operator may support both the GSM/GPRS/EDGE and the UMTS/HSPA radio access technologies since these air interfaces can share the same core network although the radio access networks are different. However, a cdma2000 network operator typically will not support GSM or UMTS radio access technology since both the radio access network and the core network are different between these air interfaces.

In some implementations of network scanning by a mobile device, the GSM and UMTS bands are further organized into band groups to take advantage of usage or typical deployment of these bands based on geographical location. For example, band group 1 may include GSM 850 MHz and 1900 MHz, and UMTS 850 MHz and 1900 MHz, this band group comprising frequency bands used in North America. Band group 2 may include GSM 900 MHz and 1800 MHz, and UMTS 900 MHz, 1800 MHz and 2100 MHz, this band group comprising frequency bands that are used in the rest of the world. As a specific example, the 1900 MHz band includes an uplink band in the range 1850 MHz to 1910 MHz, and a downlink band in the range 1930 MHz to 1990 MHz. A specific example of assignment of the 5 MHz blocks in a particular location might include the following for the downlink:

1930 MHz -1935 MHz: CDMA—network operator 1
1935 MHz -1940 MHz: GSM—network operator 2
1940 MHz -1950 MHz: UMTS—network operator 2
1950 MHz -1960 MHz: CDMA—network operator 3
1960 MHz -1965 MHz: GSM—network operator 4

When a multimode mobile device initiates network scanning for available service upon power-up or loss of network connectivity, it typically attempts to find a network using the same radio access technology that was last used. The frequency scans for different radio access technologies are separate even when scanning is performed on the same frequency band. In other words, when the mobile device scans for available networks of a given radio access technology, the underlying scanning mechanism is tightly coupled with the physical layer characteristics of the associated radio access technology and varies from one radio access technology to another. For example, the scanning mechanisms for CDMA, GSM, and UMTS in the same 1900 MHz band are distinctly different and the actual scanning is done separately for each radio access technology in case of a single receiver implementation. In addition, the mobile device initially selects the same frequency band or band group where it last acquired service. For example, if a mobile device was previously operating using GSM on the 1900 MHz band prior to power off, the mobile device after subsequent power on will initiate a GSM network scan on 1900 MHz. This will be band group 1 for the example above where the mobile device was previously using 1900 MHz GSM. After that, in typical implementations the multi-mode mobile device switches to performing scanning for GSM or UMTS using band group 2, before switching to performing scanning for a CDMA network.

Network scanning may, for example, involve looking at all the relevant frequencies in a frequency band. For example, a GSM scan in the 1900 MHz band may involve scanning a total of 299 200-KHz-wide frequency channels. Excessive scanning can be costly for the mobile device in terms of battery life as well slowness in acquiring service.

BRIEF DESCRIPTION OF THE DRAWINGS

Embodiments of the disclosure will now be described with reference to the attached drawings in which.

DETAILED DESCRIPTION OF THE EMBODIMENTS

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

According to one broad aspect, the disclosure provides a method in a mobile device, the method comprising: scanning for a network; upon finding a network, obtaining network identification information for the network; determining whether the network identification information is included in black-list network information of the mobile device prior to making any access attempt on the network; if the network identification is not included in black-list network information of the mobile device, attempting to access the network; and if the network information is included in the black-list network information of the mobile device: determining from the black-list network information at least one radio access technology that is barred for that network identification information; and continuing scanning for a network that uses a radio access technology other than the at least one radio access technology that is barred.

According to another broad aspect, the disclosure provides a mobile device comprising: a wireless access radio operable to communicate with wireless networks; and a network scan function configured to: scan for a network; upon finding a network, obtain network identification information for the network; determine whether the network identification information is included in black-list network information prior to making any access attempt on the network; if the network identification is not included in black-list network information of the mobile device, attempt to access the network; and if the network information is included in the black-list network information of the use equipment: determine from the black-list network information at least one radio access technology that is barred for that network identification information; and continue scanning for a network that uses a radio access technology other than the at least one radio access technology that is barred.

According to another broad aspect, the disclosure provides a computer readable medium having instructions stored thereon for instructing a mobile device to execute a method comprising: scanning for a network; upon finding a network, obtaining network identification information for the network; determining whether the network identification information is included in black-list network information of the mobile device prior to making any access attempt on the network; if the network identification is not included in black-list network information of the mobile device, attempting to access the network; and if the network information is included in the black-list network information of the mobile device: determining from the black-list network information at least one radio access technology that is barred for that network identification information; and continuing scanning for a network that uses a radio access technology other than the at least one radio access technology that is barred.

Other aspects and features of the present disclosure will become apparent, to those ordinarily skilled in the art, upon review of the following description of the embodiments.

Introduction

A multi-mode mobile device may have "black-list" network information, typically configured by a service provider or network operator, which restricts the networks and associated RATs the mobile device is allowed to access. An entry in the black-list network information includes network identification information, and for the particular network identification information at least one radio access technology that is barred from being accessed using a network having that network identification information. The following is an example of a form of an entry in black-list network information:

<network identification information (NII)>:<radio access technology (RAT)>

The following is another example where each column relates to a radio access technology and contains a list of network identification information:

| RAT_A | RAT_B | RAT_C |
|-------|-------|-------|
| NII_A1 | NII_B1 | NII_C1 |
| NII_A2 | NII_B2 | NII_C2 |

The network identification information may for example include MCC (mobile country code) and/or MCC and MNC (mobile network code) for GSM and UMTS networks and may for example include MCC, MNC and SID (system identifier) and NID (network identifier) for CDMA 1x networks or Subnet ID for CDMA 1xEV-DO networks. In some embodiments, a multimode device may not have CDMA networks on its black-list as other mechanisms such as the preferred roaming list can be used to ensure the preferred CDMA network is used.

As an example, if the black-list network identification information simply includes an MCC and a particular radio access technology, that means that any network having that country code using that radio access technology is not to be used. If the black-list network information includes an MCC and an MNC and a particular radio access technology, then only the network having the MCC and MNC and that network radio access technology is not to be used.

Current multi-mode mobile devices do not take into account the frequency block(s), band(s) and RAT(s) of networks that the mobile device is not supposed to acquire while it performs a network scan. Rather, if a multi-mode device encounters a black-list network within a given frequency band during a network scan, it will still keep on scanning the rest of the frequency band as well as other relevant frequency bands in the associated band group for a given RAT (or multiple black-list RATs) if applicable instead of switching to scanning of a permitted RAT in the same frequency band or other bands. Excessive scanning can be costly for the mobile device in terms of battery life and responsiveness to provide service, especially in situations when unnecessary scans can be avoided.

Method of Network Scanning

Figure 1:
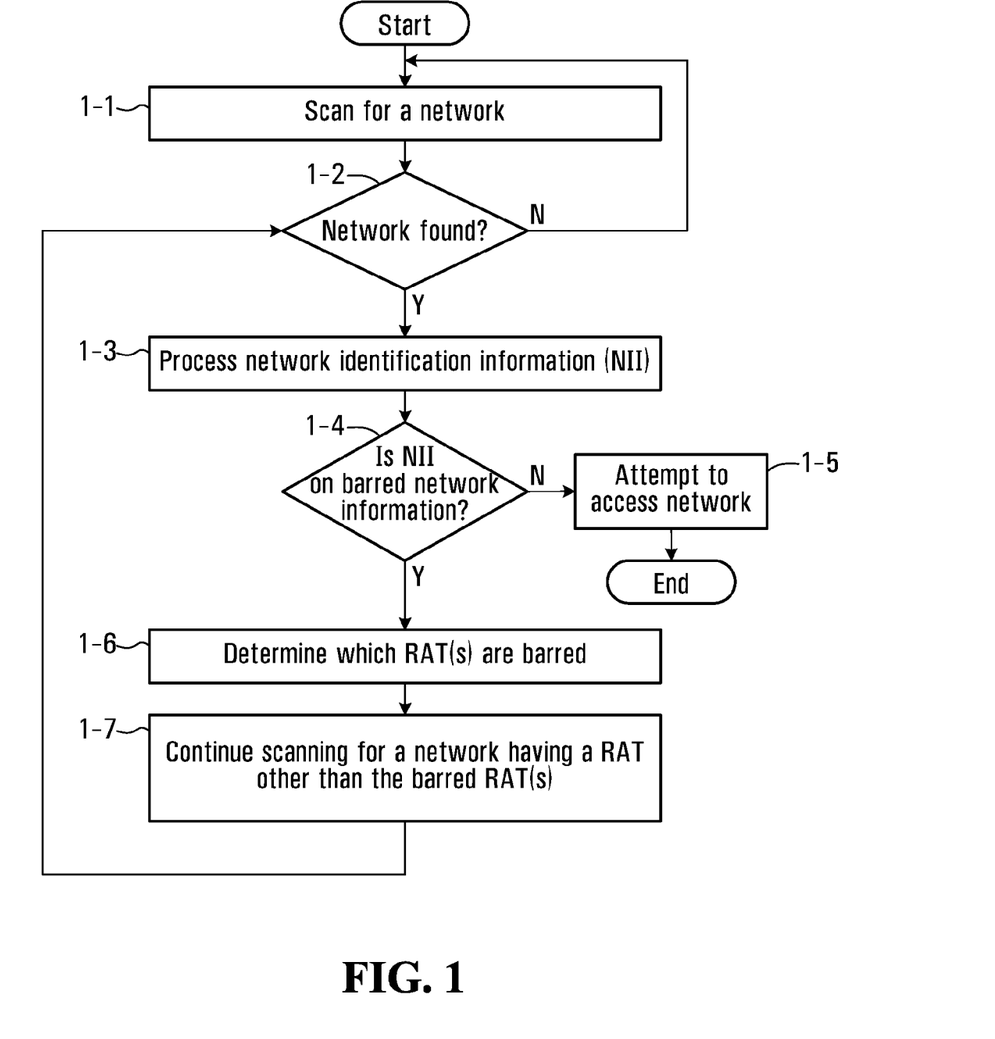
FIG. 1 is a flowchart of a method of performing network scanning in a multi-mode mobile device.

Referring now to FIG. 1, shown is a flowchart of a method of performing network scanning by a mobile device. The method begins at block 1-1 with the mobile device scanning for a network. This continues until a network is found (yes path block 1-2). Upon finding a network, the mobile device obtains network identification information for the network at block 1-3. This may for example involve receiving and processing a broadcast channel transmitted by the network that was found. At block 1-4, the mobile device determines prior to making any access attempt on the network whether the network identification information is included in the black-list network information. If the network identification is not included in the black-list network information (no path block 1-4) then the mobile device attempts to access the network at block 1-5.

However, if the network information is included in the black-list network information (yes path block 1-4) then the mobile device determines in block 1-6 the radio access technology or technologies that is/are barred for that network identification information. At block 1-7, the mobile device continues scanning for another network using a radio access technology other than the barred radio access technology. This may involve, for example, switching to scanning for a different radio access technology. Thus, scanning for the barred radio access technology, which can be costly for the mobile device in terms of wireless resources and battery life, is avoided. At that point, the method continues back at block 1-2.

Scanning for a network can involve looking at possible frequencies on a bandwise basis, frequency block basis, or on an individual frequency basis, or combinations of these bases. Scanning on a bandwise basis involves completing a search for a first band before moving onto another band. A frequency block may be a contiguous subset of a band. Scanning on a frequency block basis involves completing a search for a given frequency block before moving on to another frequency block. Scanning for discrete frequencies is the most general case in which scanning is not limited to being performed in ascending or descending order within a frequency band or on contiguous blocks or bands.

In the above example, once a barred network is found, the barred network having a particular radio access technology, the mobile device stops scanning for any network having that radio access technology as well as other associated radio access technologies. A specific example of black-list-driven network or RAT avoidance is the case of a US CDMA network operator that provides only CDMA service to its subscribers in North America. Such a US CDMA operator does not typically want its subscribers to connect to GSM or UMTS networks while they are in North America. However, the CDMA operator does typically want its subscribers to connect to GSM or UMTS networks while its subscribers are roaming outside of North America without being restricted to using the same bands used in North America. For example, when one of the US CDMA operator's subscribers travels to Europe and connects their mobile device to a GSM network, and subsequently transports the mobile device back to North America, the mobile device will attempt to find a network starting with a GSM scan. If during the GSM scan the mobile device detects a North American GSM or UMTS network based on received network identification information, the mobile device will skip all further GSM and UMTS networks for scanning purposes.

In a first specific example, assume that the black-list network information includes the following, where MCCx represents a specific MCC:

MCCx: GSM,UMTS

This means that any GSM or UMTS network in the country represented by MCCx is barred. If in the process of performing a scan the mobile device finds a network having network identification information <MCCx, MNCy>, the mobile device determines prior to accessing the network (e.g. to perform registration) whether or not the network is barred by referring to the black-list network information. The mobile device looks to see what type of network is barred, in this case GSM and UMTS. If the found network is not a GSM or a UMTS network, the network is not barred and the mobile device can proceed with the connection. If the found network is a GSM or a UMTS network, the network is barred, and furthermore the mobile device will abort the ongoing search for GSM or UMTS and refrain from doing GSM or UMTS scans on any other relevant frequency bands. For a device that handles GSM, UMTS and CDMA technologies, this means the mobile device will start scanning for a CDMA network.

In some embodiments, having found a network that is subsequently determined to be barred, the mobile device determines which frequency block the network was using. Equivalently, the mobile device determines which frequency block was being scanned when it found the network. Then, when the mobile device continues scanning using a different radio access technology, it either refrains from scanning that frequency block entirely, with knowledge that the frequency block is not assigned to the different radio access technology, or it defers scanning that frequency block until most or all other possible frequencies have been scanned. This latter approach allows for the possibility that the mobile device may have moved to a different area where that frequency block was assigned to the different radio access technology. For example, the presence of a GSM or UMTS network in a particular 5 MHz block within the 1900 MHz band indicates that the 5 MHz block is not used by CDMA 1x or 1xEV-DO and hence that block does not have to search for CDMA 1x or 1xEV-DO for the immediate CDMA scan in the same 1900 MHz band, or the searching of that block can be done last.

In some embodiments, the black-list network information also includes barred frequency information indicating specific frequencies that are barred for a given radio access technology and a given network identification information. In some embodiments, this information is used to further enhance the efficiency of network scanning. The barred frequency information may for example include an identification of one or more frequency blocks that are barred for a particular radio access technology, and network identification information. In general, a frequency block includes one or more frequencies.

In some embodiments, a mobile device determines which entries in the black-list network information are relevant to its current location and determines from the black-list network information at least one frequency that is barred in the mobile device's current location. Accordingly, the mobile device refrains from scanning the at least one frequency that is barred. Alternatively, the mobile device scans the at least one frequency that is barred only after searching other possible frequencies.

Note that the black-list network information might include relevant blocks that are barred for the radio access technology currently being scanned, and/or relevant blocks that are barred for a different radio access technology. Regardless, the blocks that are barred can be skipped. For the case where a block is barred for the radio access technology currently being searched, it is clear that that radio access technology is not to be used for that frequency block. For the case that a block is barred for a different radio access technology, it can be inferred that the block is in fact allocated to the different radio access technology, and therefore there is no point searching that block using the radio access technology being searched.

The above approach will now be illustrated further by way of a detailed example. The following is a specific example of contents in black-list network information:

| RAT | network identification information | barred frequency block(s) |
|---|---|---|
| UMTS | MCC = 310 | 1930 MHz-1940 MHz |
| GSM | MCC = 310 | 1940 MHz-1950 MHz |

Suppose a mobile device, prior to a power down, was using a GSM network, and that while powered down, the mobile device was moved to a different location where it is expected to use a CDMA network. Upon powering on, the device will begin to scan for a GSM network since that was the most recently used RAT. Suppose that the mobile device finds a GSM network with MCC=310 in the 1940-1950 MHz block. The mobile device will see from the black-list network information that this network is barred, and the device will abort scanning on any band for GSM or UMTS, as described in detail previously. Furthermore, as a result of finding a network with MCC=310 the mobile device can determine that there are entries for both UMTS and GSM that are relevant to its current location. At this point, the mobile device commences scanning for a CDMA network. The mobile device looks up the frequency blocks that are barred for the current country code (MCC=310) and refrains from searching those frequency blocks. In the above described example, UMTS included barred frequencies from 1930 to 1940 MHz, and GSM included barred frequencies from 1940-1950 MHz. As such, when the mobile device performs CDMA searching, it can refrain from searching in the 1930-1950 MHz band.

Figure 2:
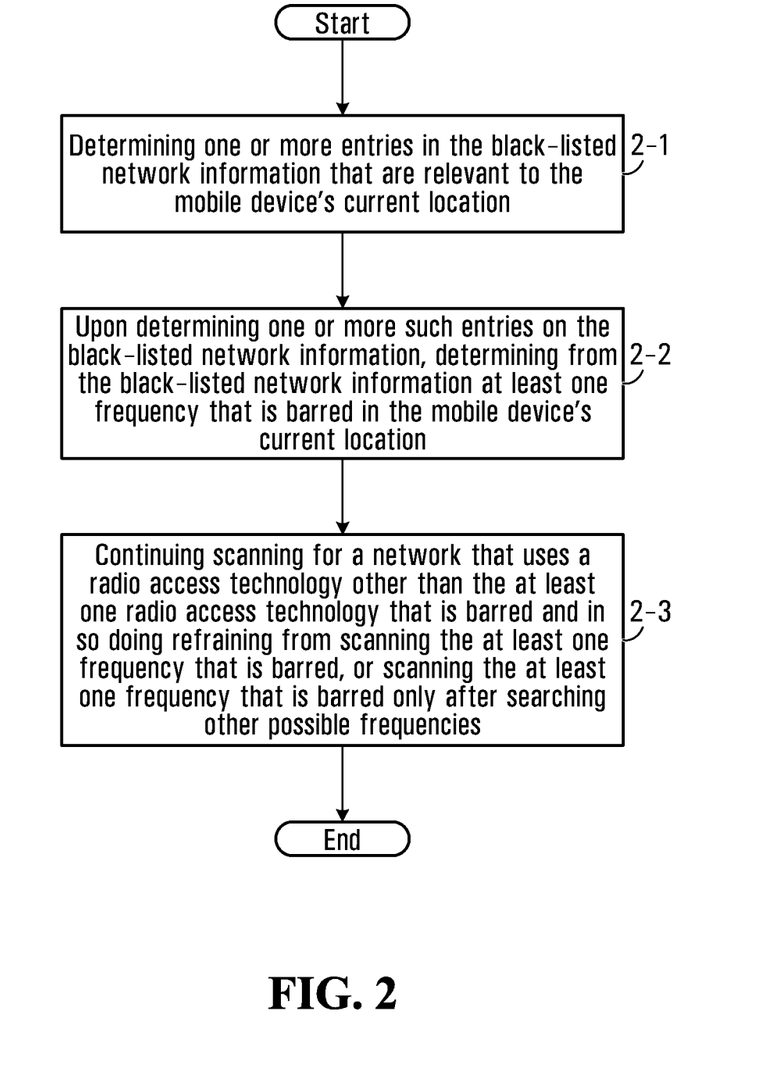
FIG. 2 is a flowchart of another method of performing network scanning in a multi-mode mobile device.

Referring now to FIG. 2, shown is a flowchart of a method for black-list-driven network or RAT avoidance. The method begins at block 2-1 with determining one or more entries in the black-list network information that are relevant to the mobile device's current location. One method for determining which entries are relevant is to identify the entries in the black-list network information which have the same MCC as a scanned network In block 2-2, upon determining one or more such entries in the black-list network information, the mobile device determines from the black-list network information at least one frequency that is barred in the mobile device's current location. The method continues at block 2-3 with continuing scanning for a network that uses a radio access technology other than the at least one radio access technology that is barred and in so doing refraining from scanning the at least one frequency that is barred, or scanning the at least one frequency that is barred only after searching other possible frequencies. Scanning for the barred radio access technology, which can be costly for the mobile device in terms of battery life and responsiveness to provide service, is avoided.

Mobile Device for Network Scanning

Figure 3:
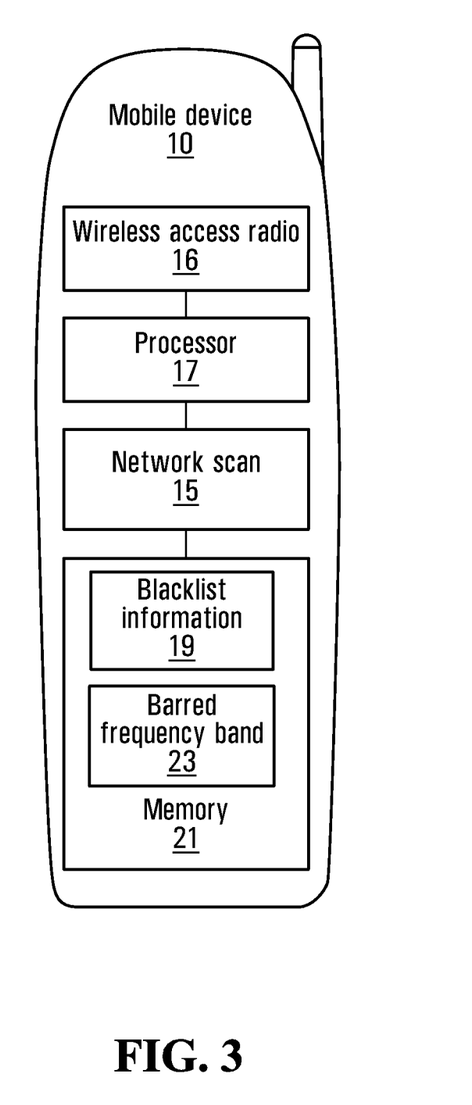
FIG. 3 is a block diagram of an example mobile device.

Referring now to FIG. 3, shown is a block diagram of an example mobile device 10. The mobile device 10 has a wireless access radio 16, a processor 17, and a network scan function 15 having access to black-list information that may for example be stored in a memory 21; the mobile device 10 may have other components, but they are not shown for sake of simplicity.

In operation, the mobile device 10 scans for a wireless network (not shown). The mobile device 10 can communicate with wireless networks using its wireless access radio 16 provided that the wireless network coverage is available in the geographical area in which the mobile device 10 resides. The particular wireless network or wireless networks and associated RAT (such as CDMA, GSM, UMTS etc.) available in a particular geographical area depend upon which have been deployed and are therefore available. The network scan function 15 performs a coordinated search for a network using one of the above-described methods that allow for a reduction in the scanning done for networks using a particular radio access technology for which a barred network has already been found.

In some embodiments the mobile device has barred frequency band store 23, possibly implemented within memory 21 for example, in which is stored an indication of the frequency band of a network that was found, and that was barred. Then, when the scan for another network, using a different radio access technology is employed, the band is skipped, or the band is scanned last. In some embodiments, the black-list network information includes barred frequency information, and this is used to further enhance the efficiency of scanning as described previously. For instance, the frequency band store 23 might store frequency block information.

Black-List Network Information

Details of an example of the black-list network information can be found in commonly assigned co-pending application Ser. No. 11/173,031 entitled "System and Method for Managing Forbidden Network Lists on a Wireless User Equipment (UE) Device" filed on Jul. 1, 2005 hereby incorporated by reference in its entirety and will now be described by way of example. In this description, black-listed networks are referred to as "forbidden networks".

Figure 4:
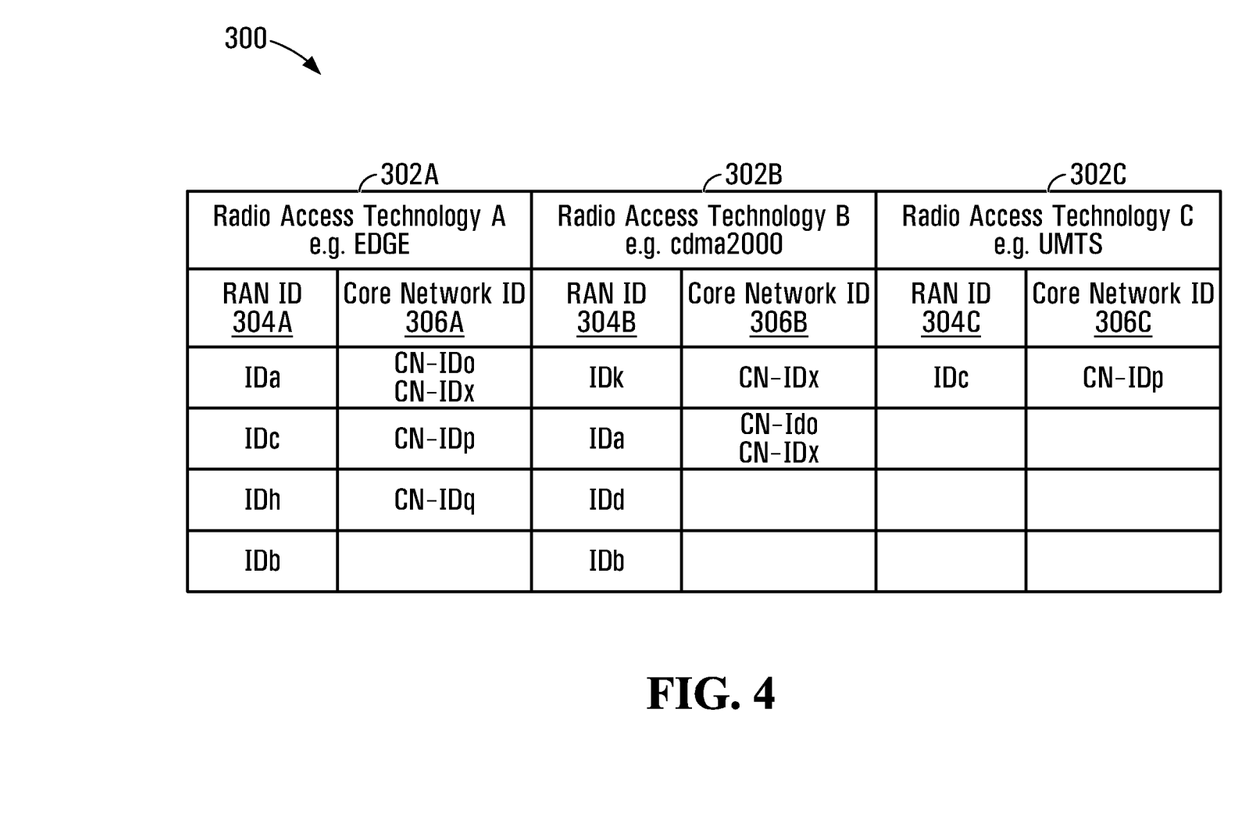
FIG. 4 is a table that depicts an exemplary database structure associated with a PLMN list.

Referring now to FIG. 4, shown is a table depicting an exemplary database structure that may be provided, either partially or in any combination, as part of an RSM (Removable Storage Manager), or stored in memory integrated within a wireless device, or provisioned at a network node (e.g., a home network node or a broker associated therewith) from which network list information may be selectively downloaded to the wireless device for purposes of the present disclosure. In specific implementations, the database structure is stored in the memory 21 of the mobile device 10 shown in FIG. 3.

At the outset, it should be appreciated that the various exemplary database structures set forth in the present disclosure may typically be implemented as configurable databases where the entries, elements or other contents can be modified via over-the-air (OTA) methods. For example, a network operator can add, delete, or modify any portion of the relevant network list database(s) as well as selection control database (s). In particular, reference numeral 300 in FIG. 4 refers to an exemplary database structure that may be provided as an operated-based list, a user-based list or an enterprise-based list, or any combination thereof, for facilitating network selection preferences and prohibitions according to one aspect of the present disclosure.

In one embodiment, the database structure 300 is configured as an operator-defined network list that specifies a plurality of network IDs which should be considered as forbidden networks in one or more radio access technologies, wherein the network IDs are populated by the operator. In another embodiment, the database structure 300 may be configured as one or more user-defined network lists, with one list per user using the wireless UE device, for example, wherein the data entries relate to user-defined forbidden networks.

Each such list may be accessed by the users upon identifying themselves to the device, wherein the contents of the list (i.e., network IDs) are populated by the respective users. In yet another embodiment, the database structure 300 may be configured as a list of network IDs that are forbidden by an enterprise owning the wireless devices for the benefit of its employee-users.

Irrespective of the particular configuration, the database structure 300 defines a plurality of radio access technologies, e.g., EDGE technology 302A, cdma2000 technology 302B, and UMTS technology 302C, wherein a number of RAN IDs are provided for each technology. As illustrated in FIG. 4, column 304A identifies multiple RAN IDs for the EDGE technology, each RAN supporting one or more core networks identified in corresponding column 306A. Likewise, columns 304B/306B and columns 304C/306C are provided for the cdma2000 and UMTS technologies respectively. As one skilled in the art may appreciate, the various IDs can be Service Set IDs (SSIDs) (for WLAN), [MCC, MNC], [SID, NID] (for CDMA 1x), Subnet Id (for CDMA 1xEV-DO) or [MCC,MNC] combinations (for GSM and UMTS). The database structure 300 is similar to the structure previously described with reference to FIGS. 1 and 2, except that the database structure 300 does not include barred frequency block(s). Also, the database structure 300 uses RAN ID and Core Network ID for network identification information instead of mobile country code. As indicated above, the network identification information is typically dependent upon the type of wireless network technology.

Similar to the forbidden or barred network lists set forth above, an analogous database structure may be provided that identifies one or more networks that are preferred. Such a list of preferred networks may be configured as, for example, an operator-preferred RAN list (i.e., specified by an operator), enterprise-preferred RAN list (i.e., specified by an enterprise), operator-preferred CN list (i.e., specified by an operator), and enterprise-preferred CN list (i.e., specified by an enterprise).

Additionally, the provisioning of various preferred and barred/forbidden network lists may be accompanied with appropriate device-based logic or RSM-based logic for specifying the order in which to use them in connection with scanning and network selection. Moreover, each country may have its own regulatory requirements as to which list should take precedence. An enterprise company for instance may forbid access to a public WLAN access point that operates in the vicinity of the company's premises. Further, certain additional logic may be necessary for specifying the scanning behavior as well, since there may be a number of bands on per-technology basis in which the device is capable of scanning. For instance, a list ordering scheme or associated logic may be provided with the device whereby a particular priority order is imposed on the various network lists. If no particular hierarchy/priority is specified, then a default rule may come into play such as, e.g., an operator-defined list has a higher priority than an enterprise-defined list, which in turn has a higher priority than a user-defined list.

In some implementations, the database structure 300 is used in a method of performing network scanning in a multimode mobile device as similarly described with reference to FIG. 1. For instance, upon obtaining network identification information for a discovered network, the mobile device determines whether the network identification information is included in the database structure 300 prior to making any access attempt on the network. The mobile device attempts to access the network only if the database structure 300 does not indicate that the network is barred.

In other implementations, the database structure 300 is used in a method of performing network scanning in a multimode mobile device as similarly described with reference to FIG. 2. For such implementations, the database structure 300 would be indicative of barred frequency block(s). The mobile device determines which entries in the database structure 300 are relevant to its current location and determines from the database structure 300 at least one frequency that is barred in the mobile device's current location. Accordingly, the mobile device refrains from scanning the at least one frequency that is barred. Alternatively, the mobile device scans the at least one frequency that is barred only after searching other possible frequencies.

Additional details regarding list prioritization and scanning behavior may be found in the following commonly owned co-pending U.S. patent applications: (i) "NETWORK SELECTION SCHEME USING A ROAMING BROKER (RB)" filed Apr. 28, 2005; application Ser. No. 11/116,461; and (ii) "SYSTEM AND METHOD FOR PROVIDING NETWORK ADVERTISEMENT INFORMATION VIA A NETWORK ADVERTISEMENT BROKER (NAB)" filed Apr. 28, 2005; application Ser. No. 11/116,470.

Figure 5A:
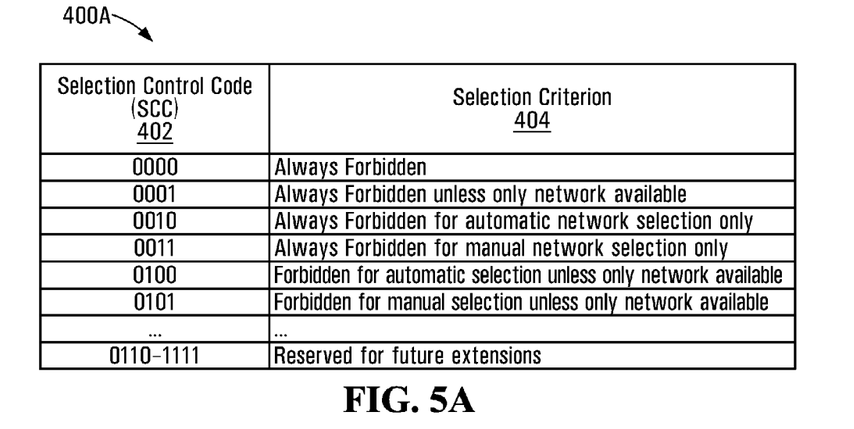
FIGS. 5A and 5B are tables that depict additional exemplary database structures that may be utilized by a UE device for selection of network(s)
Figure 5B:
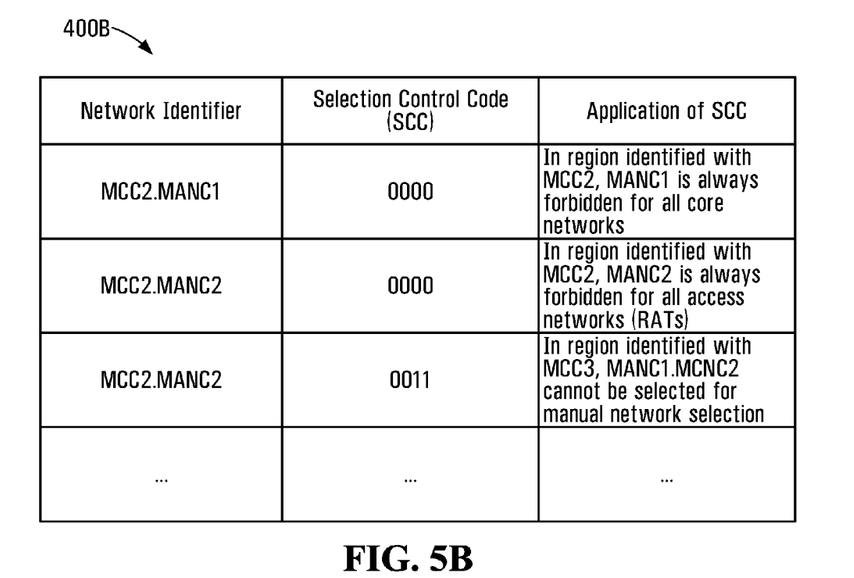

Referring now to FIGS. 5A and 5B, shown are tables that depict exemplary database structures that may be utilized by a wireless device or UE for facilitating management of PLMN list(s) in accordance with the teachings of the present disclosure. In some implementations, the database structures are utilized by a wireless device for selection of network(s) in terms of what type network along with radio access technology is allowed (white list) and not allowed (black list). As alluded to before, the illustrated database structures may be provisioned, either individually, partially, or in any combination, as part of an RSM or within the memory of a wireless device to which the RSM is operable to be coupled. Preferably, these databases are operable to be written to only once, upon providing the user name and a password associated therewith. In specific implementations, the database structures are stored in the memory 21 of the mobile device 10 shown in FIG. 3.

A first database structure 400A is operable to associate a plurality of network selection control codes (SCCs) 402 with a corresponding plurality of network selection criteria 404 related to the management of network lists (e.g. user-defined forbidden network lists, operator-defined forbidden network lists, enterprise-defined forbidden network lists, etc. that have been described hereinabove). As illustrated, SCC 402 may be comprised of a binary code, allowing for a number of selection criteria. For instance, a 4-bit code can support up to 16 selection criteria, although SCCs of variable bit sizes can support any number of selection treatments. By way of example, an SCC of [0000] indicates that all networks that have been associated with the code [0000] should be always forbidden, which cannot be overridden by the user even during manual selection. In another example, an SCC of [0001] indicates that all networks having been associated with the code [0001] should always be forbidden, except when they are the only networks available for selection. Likewise, SCCs of [0010] and [0011] indicate, respectively, that such networks should always be forbidden for automatic selection only or for manual network selection only. Additional treatment options may be configured by the network operator at the time of provisioning to define further modalities of application of a forbidden network list on a wireless device.

A second database structure 400B is preferably populated with a list of networks identified by corresponding network identifiers 422, wherein each network identifier is mapped to or otherwise associated with a corresponding SCC 402. Reference numeral 424 exemplifies how the application of an SCC may modulate a wireless device's network selection process and behavior. Where an exemplary network identifier [MCC2.MANC1] is mapped to the code [0000], the access network identified by [MANC1] is always forbidden for all core networks in a geographic region identified by [MCC2]. In a second example, the network identifier [MCC2.MCNC2] is associated with the code to indicate that the core network identified by [MCNC2] is always forbidden for all access networks and technologies in the geographic region identified by [MCC2]. Likewise, in a third example, the network identifier [MCC3.MANC1.MCNC2] is associated with the code [0011] to indicate that the particular AN/CN network combination identified by the codes [MANC1] and [MCNC2] cannot be selected for manual network selection in the geographic region identified by [MCC3]. The database structure 400B is similar to the structure previously described with reference to FIGS. 1 and 2, except that the database structure 400B does not include barred frequency block(s).

Those skilled in the art should recognize that database structures or logic similar to the databases 400A and 400B described above may be provisioned for other types of network lists as well, e.g., operator-defined preferred network lists, user-defined preferred network lists, and enterprise-defined preferred network lists, etc. Furthermore, appropriate prioritization logic may also be interfaced with the selection control databases 400A and 400B to further modulate the selection behavior. Additionally or alternatively, the selection control databases may be integrated together into a single structure, or may be integrated with other structures such as network lists, either individually, partially, or in any combination, depending on a particular implementation and provisioning.

In some implementations, the database structures set forth above may be provisioned and updated only by a network operator (e.g., a home network operator associated with the wireless device). By implementing a "network blacklist" scheme facilitated by the database structures 400A/400B, a number of capabilities may be realized: (i) prevent access to networks on a list by automatic selection; (ii) prevent access to networks on a list by automatic selection except when no other networks are available; (iii) prevent access to networks on a list by automatic and manual selection (i.e., removal of networks on an operator-defined blacklist by manual selection is prevented; and (iv) prevent access to networks on a list by automatic and manual selection except when there are no other networks are available for selection.

In some implementations, the network blacklist scheme facilitated by the database structures 400A/400B is used in a method of performing network scanning in a multi-mode mobile device as similarly described with reference to FIG. 1. For instance, upon obtaining network identification information for a discovered network, the mobile device determines whether the network identification information is included in the network blacklist prior to making any access attempt on the network. The mobile device attempts to access the network only if the network blacklist does not indicate that the network is barred.

In other implementations, the network blacklist scheme facilitated by the database structures 400A/400B is used in a method of performing network scanning in a multi-mode mobile device as similarly described with reference to FIG. 2. For such implementations, the database structures 400A/400B would be indicative of barred frequency block(s). The mobile device determines which entries in the database structures 400A/400B are relevant to its current location and determines from the database structures 400A/400B at least one frequency that is barred in the mobile device's current location. Accordingly, the mobile device refrains from scanning the at least one frequency that is barred. Alternatively, the mobile device scans the at least one frequency that is barred only after searching other possible frequencies.

Figure 6:
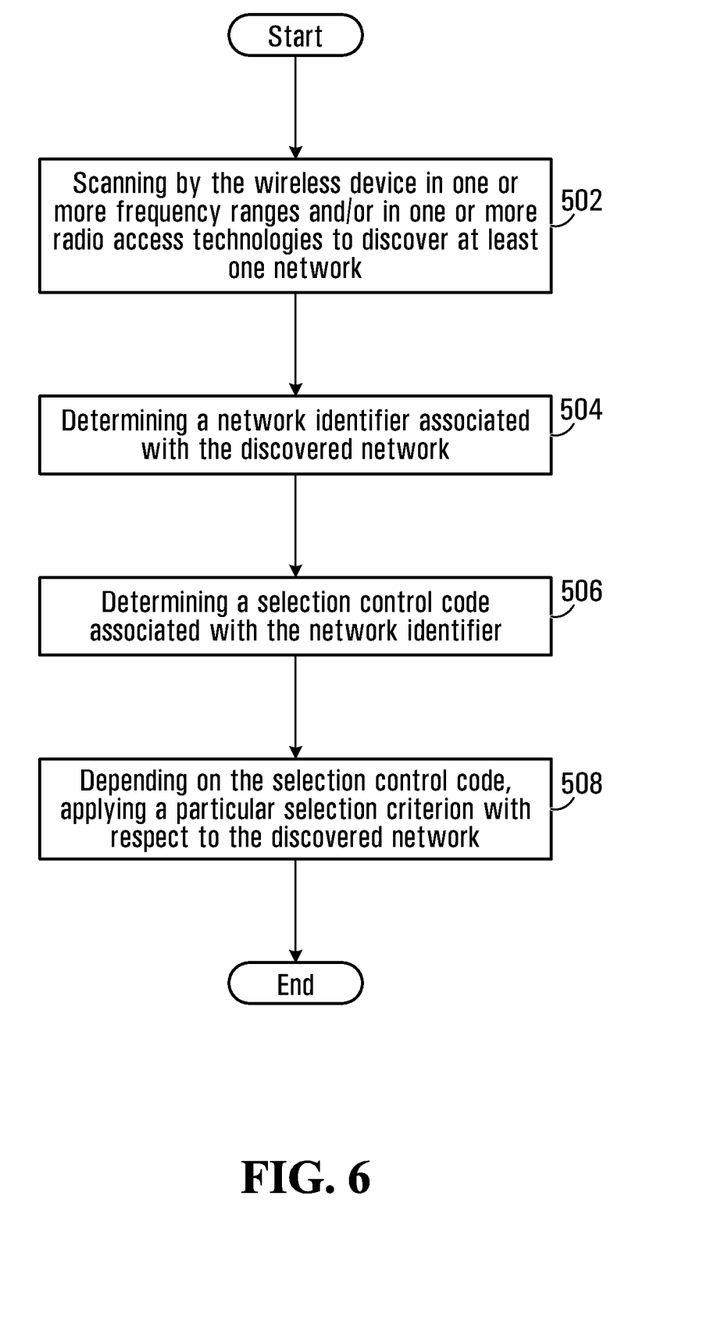
FIG. 6 is a flowchart of a method associated with an embodiment of the present disclosure.

Referring now to FIG. 6, shown is a flowchart of a method associated with an embodiment of the present disclosure wherein a network selection method is disclosed that is modulated by application of a network list associated with a wireless device. In specific implementations, the method is implemented by the network scan function 15 of the mobile device 10 shown in FIG. 3. More generally, the method can be implemented in any appropriately configured mobile device.

Upon scanning by the wireless device in one or more frequency ranges and/or in one or more radio technologies, at least one network may be discovered (block 502), whose identity information is decoded to determine a network identifier associated therewith (block 504). A selection control code associated with the network identifier is then determined (block 506), e.g., by way of querying a suitable data structure such as the database structures described above with reference to FIGS. 4A and 4B. Depending on the selection control code, a particular selection criterion is applied to the discovered network (block 508).

Another Mobile Device

Figure 7:
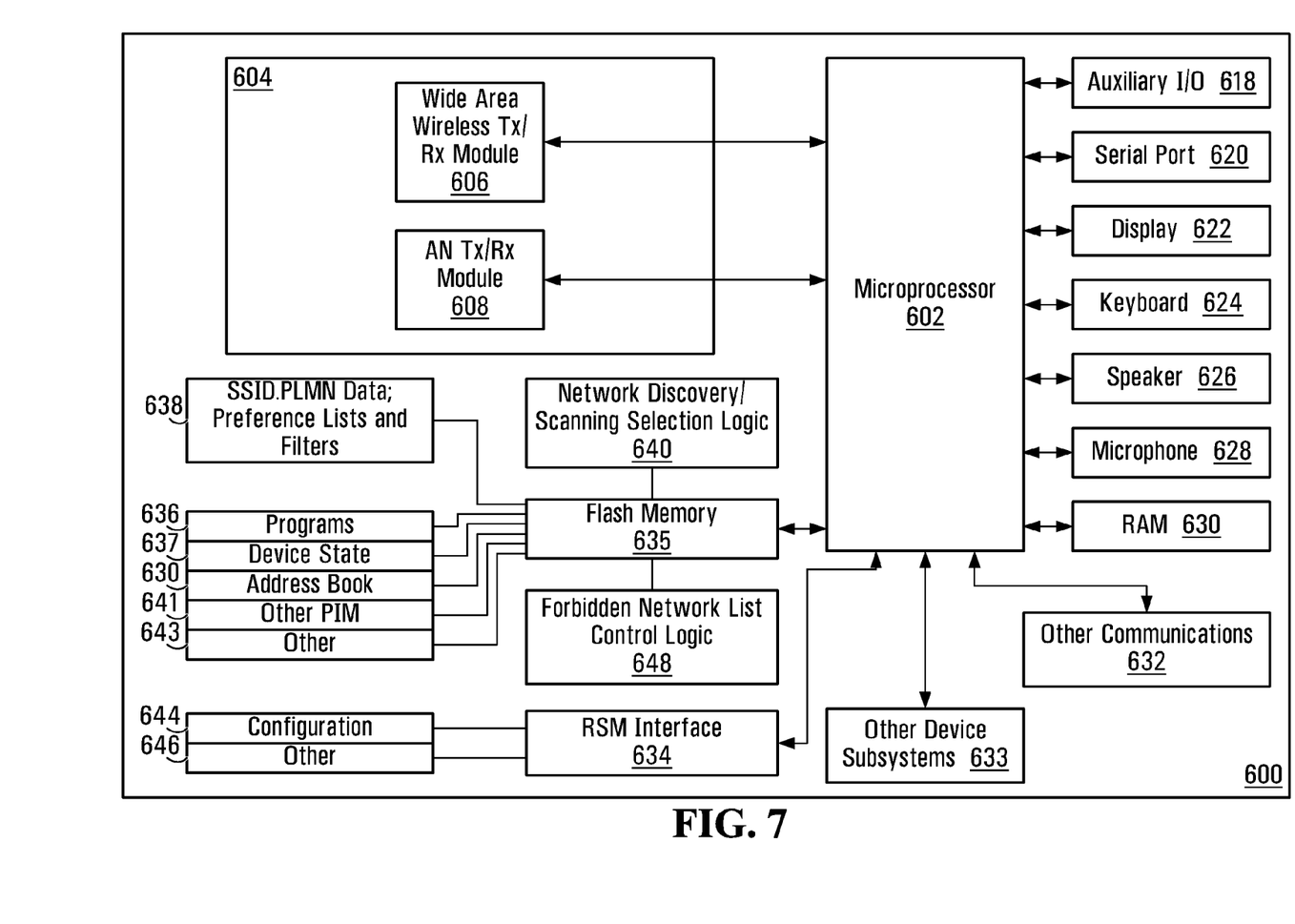
FIG. 7 is a block diagram of an example wireless UE device according to the teachings of the present disclosure.

Referring now to FIG. 7, shown is a block diagram of an embodiment of a wireless device or UE according to the teachings of the present disclosure. It will be recognized by those skilled in the art upon reference hereto that although an embodiment of mobile device 10 shown in FIG. 3 may comprise an arrangement similar to one shown in FIG. 7, there can be a number of variations and modifications, in hardware, software or firmware, with respect to the various modules depicted. Accordingly, the arrangement of FIG. 7 should be taken as illustrative rather than limiting with respect to the embodiments of the present disclosure.

A microprocessor 602 providing for the overall control of UE 600 is operably coupled to a communication subsystem 604 which includes transmitter/receiver (transceiver) functionality for effectuating multi-mode scanning and communications over a plurality of bands. By way of example, a wide area wireless Tx/Rx module 606 and a wireless AN Tx/Rx module 608 are illustrated. Although not particularly shown, each Tx/Rx module may include other associated components such as one or more local oscillator (LO) modules, RF switches, RF bandpass filters, A/D and D/A converters, processing modules such as digital signal processors (DSPs), local memory, etc. As will be apparent to those skilled in the field of communications, the particular design of the communication subsystem 604 may be dependent upon the communications networks with which the UE device is intended to operate. In one embodiment, the communication subsystem 604 is operable with both voice and data communications.

Microprocessor 602 also interfaces with further device subsystems such as auxiliary input/output (I/O) 618, serial port 620, display 622, keyboard 624, speaker 626, microphone 628, random access memory (RAM) 630, a short-range communications subsystem 632, and any other device subsystems generally labeled as reference numeral 633. To control access and manage the device configuration, an RSM (SIM/RUIM/USIM) interface 634 is also provided in communication with the microprocessor 602. In one implementation, RSM interface 634 is operable with an RSM card having a number of key configurations 644 and other information 646 such as identification and subscriber-related data as well as one or more SSID/PLMN lists and database filters described in detail hereinabove.

Operating system software and other control software may be embodied in a persistent storage module (i.e., non-volatile storage) such as Flash memory 635. In one implementation, Flash memory 635 may be segregated into different areas, e.g., storage area for computer programs 636 as well as data storage regions such as device state 637, address book 639, other personal information manager (PIM) data 641, and other data storage areas generally labeled as reference numeral 643. Additionally, appropriate network discovery/selection logic 640 may be provided as part of the persistent storage for executing the various network discovery/scanning and network selection procedures set forth in the preceding sections. Further, another logic module 648 is provided for facilitating forbidden network list control logic, etc. Associated therewith is a storage module 638 for storing the SSID/MCC/MNC/SID/NID/SubnetID lists, selection/scanning filters, capability indicators, et cetera, also described in detail hereinabove.

Figure 8:
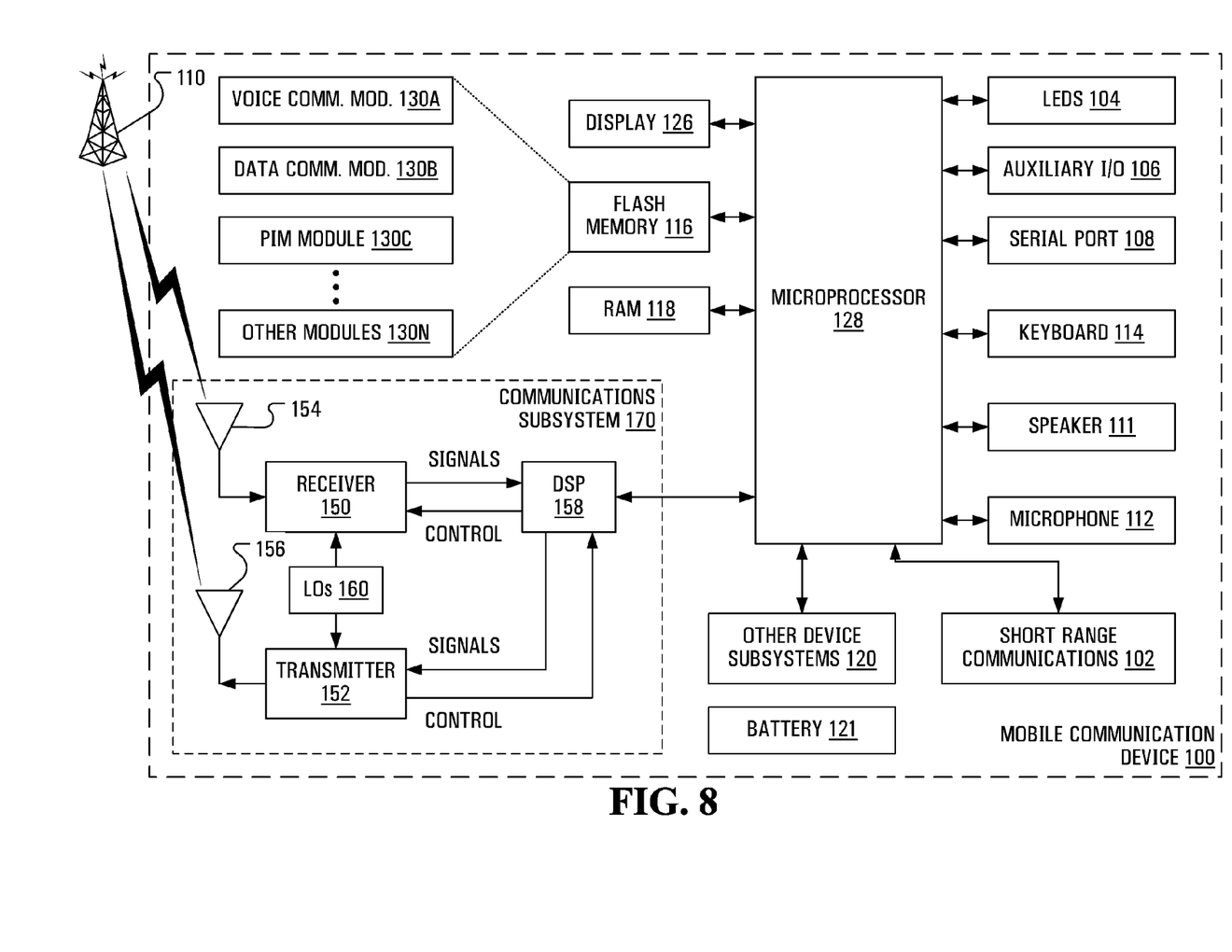
FIG. 8 is a block diagram of another mobile device.

Referring now to FIG. 8, shown is a block diagram of another mobile device 100 that may implement any of the mobile device methods described herein. The mobile device 100 is shown with specific components for implementing features similar to those of the mobile device 10 of FIG. 3. It is to be understood that the mobile device 100 is shown with very specific details for example purposes only.

A processing device (a microprocessor 128) is shown schematically as coupled between a keyboard 114 and a display 126. The microprocessor 128 is a type of processor with features similar to those of the processor 17 of the mobile device 10 shown in FIG. 3. The microprocessor 128 controls operation of the display 126, as well as overall operation of the mobile device 100, in response to actuation of keys on the keyboard 114 by a user.

The mobile device 100 has a housing that may be elongated vertically, or may take on other sizes and shapes (including clamshell housing structures). The keyboard 114 may include a mode selection key, or other hardware or software for switching between text entry and telephony entry.

In addition to the microprocessor 128, other parts of the mobile device 100 are shown schematically. These include: a communications subsystem 170; a short-range communications subsystem 102; the keyboard 114 and the display 126, along with other input/output devices including a set of LEDS 104, a set of auxiliary I/O devices 106, a serial port 108, a speaker 111 and a microphone 112; as well as memory devices including a flash memory 116 and a Random Access Memory (RAM) 118; and various other device subsystems 120. The mobile device 100 may have a battery 121 to power the active elements of the mobile device 100. The mobile device 100 is in some embodiments a two-way radio frequency (RF) communication device having voice and data communication capabilities. In addition, the mobile device 100 in some embodiments has the capability to communicate with other computer systems via the Internet.

Operating system software executed by the microprocessor 128 is in some embodiments stored in a persistent store, such as the flash memory 116, but may be stored in other types of memory devices, such as a read only memory (ROM) or similar storage element. In addition, system software, specific device applications, or parts thereof, may be temporarily loaded into a volatile store, such as the RAM 118. Communication signals received by the mobile device 100 may also be stored to the RAM 118.

The microprocessor 128, in addition to its operating system functions, enables execution of software applications on the mobile device 100. A predetermined set of software applications that control basic device operations, such as a voice communications module 130A and a data communications module 130B, may be installed on the mobile device 100 during manufacture. In addition, a personal information manager (PIM) application module 130C may also be installed on the mobile device 100 during manufacture. The PIM application is in some embodiments capable of organizing and managing data items, such as e-mail, calendar events, voice mails, appointments, and task items. The PIM application is also in some embodiments capable of sending and receiving data items via a wireless network 110. In some embodiments, the data items managed by the PIM application are seamlessly integrated, synchronized and updated via the wireless network 110 with the device user's corresponding data items stored or associated with a host computer system. As well, additional software modules, illustrated as another software module 130N, may be installed during manufacture.

Communication functions, including data and voice communications, are performed through the communication subsystem 170, and possibly through the short-range communications subsystem 170. The communication subsystem 170 includes a receiver 150, a transmitter 152 and one or more antennas, illustrated as a receive antenna 154 and a transmit antenna 156. The communication subsystem 170 is configured based on the RAT (e.g. CDMA or GSM) selected by the microprocessor 128. In addition, the communication subsystem 170 also includes a processing module, such as a digital signal processor (DSP) 158, and local oscillators (LOs) 160. The communication subsystem 170 having the transmitter 152 and the receiver 150 is an implementation of a wireless access radio with features similar to those of the wireless access radio 16 of the mobile device 10 shown in FIG. 3.

One or more of the modules 150, 160, 152, 158 can be configured for RAT scanning and acquisition as per instruction from microprocessor 128 in order to provide functionality similar to that of the network scan function 15 of the mobile device 10 shown in FIG. 3. The specific design and implementation of the communication subsystem 170 is dependent upon the communication network in which the mobile device 100 is intended to operate. For example, the communication subsystem 170 of the mobile device 100 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access CDMA, Personal Communications Service (PCS), Global System for Mobile Communications (GSM), etc. Other types of data and voice networks, both separate and integrated, may also be utilized with the mobile device 100.

Wireless network access may vary depending upon the type of communication system. For example, in the Mobitex™ and DataTAC™ wireless networks, mobile devices are registered on the wireless network using a unique Personal Identification Number (PIN) associated with each device. In GSM/UMTS wireless networks, however, wireless network access is typically associated with a subscriber or user of a device. A GSM/UMTS device therefore typically has a subscriber identity module, commonly referred to as a Subscriber Identity Module (SIM) card or Universal Identity Module (USIM) card, in order to operate on a GSM/UMTS wireless network. A CDMA device may have a Removable User Identity Module (R-UIM) that contains subscription information or it may contain such information in its non-volatile memory. A multi-mode GSM/UMTS/CDMA device typically contains a SIM/USIM for GSM/UMTS service and CDMA-specific configuration data resides in its non-volatile memory.

Upon acquisition of a network, the mobile device 100 may send and receive communication signals over the wireless network 110 to register with the network in order get service. Signals received from the wireless network 110 by the receive antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communication functions, such as demodulation and decoding. In a similar manner, signals to be transmitted to the wireless network 110 are processed (e.g., modulated and encoded) by the DSP 158 and are then provided to the transmitter 152 for digital to analog conversion, frequency up conversion, filtering, amplification and transmission to the wireless network 110 (or wireless networks) via the transmit antenna 156.

In addition to processing communication signals, the DSP 158 provides for control of the receiver 150 and the transmitter 152. For example, gains applied to communication signals in the receiver 150 and the transmitter 152 may be adaptively controlled through automatic gain control algorithms implemented in the DSP 158.

In a data communication mode, a received signal, such as a text message or web page download, is processed by the communication subsystem 170 and is input to the microprocessor 128. The received signal is then further processed by the microprocessor 128 for an output to the display 126, or alternatively to some other auxiliary I/O devices 106. A device user may also compose data items, such as e-mail messages, using the keyboard 114 and/or some other auxiliary I/O device 106, such as a touchpad, a rocker switch, a thumb-wheel, or some other type of input device. The composed data items may then be transmitted over the wireless network 110 via the communication subsystem 170.

In a voice communication mode, overall operation of the device is substantially similar to the data communication mode, except that received signals are output to a speaker 111, and signals for transmission are generated by a microphone 112. Alternative voice or audio I/O subsystems, such as a voice message recording subsystem, may also be implemented on the mobile device 100. In addition, the display 126 may also be utilized in voice communication mode, for example, to display the identity of a calling party, the duration of a voice call, or other voice call related information.

The short-range communications subsystem 102 enables communication between the mobile device 100 and other proximate systems or devices, which need not necessarily be similar devices. For example, the short-range communications subsystem may include an infrared device and associated circuits and components, or a Bluetooth™ communication module to provide for communication with similarly-enabled systems and devices.

Numerous modifications and variations of the present invention are possible in light of the above teachings. It is therefore to be understood that within the scope of the appended claims, the invention may be practiced otherwise than as specifically described herein.

We claim:

1. A method for execution in a mobile device, the method comprising:
   scanning for wireless networks, using a first Radio Access Technology (RAT), within at least one of a plurality of frequency blocks of a frequency band associated with the first RAT;
   upon finding a network within a given frequency block of the frequency band, obtaining network identification information for the network;
   if the network identification information is included in black-list network information of the mobile device, determining that the first RAT is barred for a current location of the mobile device;
   aborting the scanning for wireless networks on the first RAT and skipping scanning for wireless networks on any other RAT associated with the first RAT; and
   scanning for wireless networks, using a second RAT other than the first RAT and any other RAT associated with the first RAT, on frequency blocks other than the given frequency block prior to scanning on the given frequency block.

2. The method of claim 1, further comprising:
   determining whether the network identification information is included in black-list network information of the mobile device prior to making any access attempt on the network; and
   if the network identification is not included in black-list network information of the mobile device, attempting to access the network.

3. The method of claim 1, wherein scanning for a network comprises starting to scan with a previously successfully used RAT.

4. The method of claim 1, wherein:
   scanning for wireless networks using the first RAT comprises scanning for Global System for Mobile Communications (GSM) wireless networks;
   aborting the scanning for wireless networks on the first RAT comprises (i) aborting the scanning for GSM wireless networks;
   skipping scanning for wireless networks on any other RAT associated with the first RAT comprises (ii) skipping scanning for Universal Mobile Telecommunications System (UMTS) wireless networks; and
   scanning for wireless networks using the second RAT comprises scanning (iii) for Code Division Multiple Access (CDMA) wireless networks.

5. The method of claim 4, wherein steps (i), (ii) and (iii) are executed upon the mobile device moving from a first geographical area in which GSM and UMTS are not barred to a second geographical area in which GSM and UMTS are barred but CDMA is not barred.

6. The method of claim 1, wherein scanning for wireless networks using the second RAT on frequency blocks other than the given frequency block prior to scanning on the given frequency block comprises:
   refraining from scanning the given frequency block, or scanning the given frequency block only after searching other possible frequencies.

7. The method of claim 1, further comprising:
   storing the black-list network information on the mobile device.

8. A non-transitory computer readable medium having stored thereon computer executable instructions that when executed by a processor of a mobile device implement a method comprising:
   scanning for wireless networks, using a first Radio Access Technology (RAT), within at least one of a plurality of frequency blocks of a frequency band associated with the first RAT;
   upon finding a network within a given frequency block of the frequency band, obtaining network identification information for the network;

if the network identification information is included in black-list network information of the mobile device, determining that the first RAT is barred for a current location of the mobile device;

aborting the scanning for wireless networks on the first RAT and skipping scanning for wireless networks on any other RAT associated with the first RAT; and scanning for wireless networks, using a second RAT other than the first RAT and any other RAT associated with the first RAT, on frequency blocks other than the given frequency block prior to scanning on the given frequency block.

9. The non-transitory computer readable medium of claim 8, wherein the method further comprises:

determining whether the network identification information is included in black-list network information of the mobile device prior to making any access attempt on the network; and if the network identification is not included in black-list network information of the mobile device, attempting to access the network.

10. The non-transitory computer readable medium of claim 8, wherein scanning for a network comprises starting to scan with a previously successfully used RAT.

11. The non-transitory computer readable medium of claim 8, wherein:

scanning for wireless networks using the first RAT comprises scanning for Global System for Mobile Communications (GSM) wireless networks;

aborting the scanning for wireless networks on the first RAT comprises (i) aborting the scanning for GSM wireless networks;

skipping scanning for wireless networks on any other RAT associated with the first RAT comprises (ii) skipping scanning for Universal Mobile Telecommunications System (UMTS) wireless networks; and scanning for wireless networks using the second RAT comprises scanning (iii) for Code Division Multiple Access (CDMA) wireless networks.

12. The non-transitory computer readable medium of claim 11, wherein steps (i), (ii) and (iii) are executed upon the mobile device moving from a first geographical area in which GSM and UMTS are not barred to a second geographical area in which GSM and UMTS are barred but CDMA is not barred.

13. The non-transitory computer readable medium of claim 8, wherein scanning for wireless networks using the second RAT on frequency blocks other than the given frequency block prior to scanning on the given frequency block comprises:

refraining from scanning the given frequency block, or scanning the given frequency block only after searching other possible frequencies.

14. The non-transitory computer readable medium of claim 8, wherein the method further comprises:

storing the black-list network information on the mobile device.

15. A mobile device comprising:

a wireless access radio configured for communicating with wireless networks;

a processor; and a network scan function configured for:

scanning for wireless networks, using a first Radio Access Technology (RAT), within at least one of a plurality of frequency blocks of a frequency band associated with the first RAT;

upon finding a network within a given frequency block of the frequency band, obtaining network identification information for the network;

if the network identification information is included in black-list network information of the mobile device, determining that the first RAT is barred for a current location of the mobile device;

aborting the scanning for wireless networks on the first RAT and skipping scanning for wireless networks on any other RAT associated with the first RAT; and scanning for wireless networks, using a second RAT other than the first RAT and any other RAT associated with the first RAT, on frequency blocks other than the given frequency block prior to scanning on the given frequency block.

16. The mobile device of claim 15, wherein the network scan function is further configured for:

determining whether the network identification information is included in black-list network information of the mobile device prior to making any access attempt on the network; and if the network identification is not included in black-list network information of the mobile device, attempting to access the network.

17. The mobile device of claim 15, wherein the network scan function is configured for scanning for a network by starting to scan with a previously successfully used RAT.

18. The mobile device of claim 15, wherein:

the network scan function is configured for scanning for wireless networks using the first RAT by scanning for Global System for Mobile Communications (GSM) wireless networks;

the network scan function is configured for aborting the scanning for wireless networks on the first RAT by (i) aborting the scanning for GSM wireless networks;

the network scan function is configured for skipping scanning for wireless networks on any other RAT associated with the first RAT by (ii) skipping scanning for Universal Mobile Telecommunications System (UMTS) wireless networks; and the network scan function is configured for scanning for wireless networks using the second RAT by scanning (iii) for Code Division Multiple Access (CDMA) wireless networks.

19. The mobile device of claim 18, wherein the network scan function is configured for executing steps (i), (ii) and (iii) upon the mobile device moving from a first geographical area in which GSM and UMTS are not barred to a second geographical area in which GSM and UMTS are barred but CDMA is not barred.

20. The mobile device of claim 15, wherein the network scan function is configured for scanning for wireless networks using the second RAT on frequency blocks other than the given frequency block prior to scanning on the given frequency block by:

refraining from scanning the given frequency block, or scanning the given frequency block only after searching other possible frequencies.

21. The mobile device of claim 15, further comprising:

a memory configured for storing the black-list network information on the mobile device.

* * * * *